United States Patent
Lee et al.

(10) Patent No.: US 10,834,558 B2
(45) Date of Patent: Nov. 10, 2020

(54) METHOD FOR TRANSMITTING AND RECEIVING D2D SIGNAL IN WIRELESS COMMUNICATION SYSTEM, AND APPARATUS THEREFOR

(71) Applicant: LG Electronics Inc., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/517,412

(22) PCT Filed: Oct. 21, 2015

(86) PCT No.: PCT/KR2015/011158
§ 371 (c)(1),
(2) Date: Apr. 6, 2017

(87) PCT Pub. No.: WO2016/064195
PCT Pub. Date: Apr. 28, 2016

(65) Prior Publication Data
US 2017/0303222 A1   Oct. 19, 2017

Related U.S. Application Data

(60) Provisional application No. 62/066,890, filed on Oct. 21, 2014, provisional application No. 62/076,468, (Continued)

(51) Int. Cl.
*H04W 76/14* (2018.01)
*H04W 56/00* (2009.01)
(Continued)

(52) U.S. Cl.
CPC ............. *H04W 4/70* (2018.02); *H04L 5/0048* (2013.01); *H04L 5/0053* (2013.01);
(Continued)

(58) Field of Classification Search
CPC ...... H04W 76/14; H04W 92/18; H04W 72/12
(Continued)

(56) References Cited

U.S. PATENT DOCUMENTS

2011/0151887 A1   6/2011   Hakola et al.
2011/0255450 A1   10/2011  Wang et al.
(Continued)

FOREIGN PATENT DOCUMENTS

CN   103002578 A   3/2013
CN   104041099 A   9/2014
(Continued)

OTHER PUBLICATIONS

Ericsson: "On Scheduling Assignments and Receiver Behaviour", 3GPP TSG-RAN WG1 Meeting #76bis, R1-141391, Mar. 31-Apr. 4, 2014.
(Continued)

*Primary Examiner* — Khaled M Kassim
*Assistant Examiner* — Jason A Harley
(74) *Attorney, Agent, or Firm* — Dentons US LLP

(57) ABSTRACT

The present invention relates to a method and an apparatus for transmitting a device-to-device synchronization signal (D2DSS) of a first terminal in a wireless communication system. Specifically, the present invention comprises the steps of: determining a D2DSS transmission-related intention of a first terminal; and, if the first terminal has the D2DSS transmission-related intention, transmitting a D2DSS to a second terminal, wherein the D2DSS is transmitted prior to a scheduling assignment period, if the first terminal has the D2DSS transmission-related intention.

4 Claims, 13 Drawing Sheets

Related U.S. Application Data filed on Nov. 6, 2014, provisional application No. 62/077,888, filed on Nov. 10, 2014, provisional application No. 62/080,253, filed on Nov. 14, 2014, provisional application No. 62/154,738, filed on Apr. 30, 2015, provisional application No. 62/161,853, filed on May 14, 2015, provisional application No. 62/086,175, filed on Dec. 1, 2014, provisional application No. 62/146,177, filed on Apr. 10, 2015, provisional application No. 62/150,869, filed on Apr. 22, 2015.

(51) Int. Cl.

| *H04L 5/00* | (2006.01) |
|---|---|
| *H04W 4/70* | (2018.01) |
| *H04W 72/12* | (2009.01) |
| *H04W 72/04* | (2009.01) |
| *H04W 92/18* | (2009.01) |
| *H04W 72/08* | (2009.01) |
| *H04W 84/12* | (2009.01) |

(52) U.S. Cl.
CPC ......... *H04L 5/0091* (2013.01); *H04W 56/001* (2013.01); *H04W 72/042* (2013.01); *H04W 72/0446* (2013.01); *H04W 72/12* (2013.01); *H04W 72/044* (2013.01); *H04W 72/082* (2013.01); *H04W 84/12* (2013.01); *H04W 92/18* (2013.01)

(58) Field of Classification Search
USPC .......................................... 370/350; 455/450
See application file for complete search history.

(56) References Cited

U.S. PATENT DOCUMENTS

| 2013/0083753 | A1 | 4/2013 | Lee et al. |
| 2013/0148566 | A1 | 6/2013 | Doppler et al. |
| 2013/0176995 | A1 | 7/2013 | Park et al. |
| 2013/0273924 | A1 | 10/2013 | Hakola et al. |
| 2013/0315215 | A1 | 11/2013 | Beale |
| 2013/0322413 | A1 | 12/2013 | Pelletier et al. |
| 2014/0016428 | A1 | 1/2014 | Akai et al. |
| 2014/0056220 | A1 | 2/2014 | Poitau et al. |
| 2014/0086153 | A1 | 3/2014 | Bontu et al. |
| 2014/0148177 | A1 | 5/2014 | Ratasuk et al. |
| 2014/0161095 | A1 | 6/2014 | Nan et al. |
| 2014/0198680 | A1 | 7/2014 | Siomina et al. |
| 2014/0321377 | A1 | 10/2014 | Ryu et al. |
| 2014/0321402 | A1 | 10/2014 | Wang et al. |
| 2014/0328329 | A1 | 11/2014 | Novlan et al. |
| 2014/0334354 | A1 | 11/2014 | Sartori et al. |
| 2015/0009910 | A1 | 1/2015 | Ryu et al. |
| 2015/0016428 | A1 | 1/2015 | Narasimha et al. |
| 2015/0098416 | A1 | 4/2015 | Kuo et al. |
| 2015/0098422 | A1 | 4/2015 | Sartori et al. |
| 2015/0289253 | A1* | 10/2015 | Pan ................... H04W 72/0413 370/329 |
| 2015/0327240 | A1* | 11/2015 | Yamada ................ H04W 72/02 455/426.1 |
| 2016/0014794 | A1* | 1/2016 | Wu ................... H04W 72/0413 370/329 |
| 2016/0021625 | A1* | 1/2016 | Li ..................... H04W 72/1289 370/336 |
| 2016/0112858 | A1 | 4/2016 | Nguyen et al. |
| 2016/0204885 | A1* | 7/2016 | Sorrentino ............ H04W 72/04 455/67.11 |
| 2016/0227496 | A1* | 8/2016 | Panteleev ............. H04W 76/18 |
| 2017/0013578 | A1* | 1/2017 | Wei ....................... H04W 8/005 |
| 2017/0078863 | A1 | 3/2017 | Kim et al. |
| 2017/0150501 | A1 | 5/2017 | Park |
| 2017/0295585 | A1 | 10/2017 | Sorrentino et al. |
| 2018/0279396 | A1 | 9/2018 | Sorrentino et al. |

FOREIGN PATENT DOCUMENTS

| JP | 2013-530570 A | 7/2013 |
| WO | 2011-130626 A1 | 10/2011 |
| WO | 2013091229 A1 | 6/2013 |
| WO | 2014129844 A1 | 8/2014 |
| WO | 2014168571 A2 | 10/2014 |

OTHER PUBLICATIONS

Intel Corporation: "Resource Allocation for Mode-2 D2D Operation", 3GPP TSG RAN WG1 Meeting #78, R1-142871, Aug. 18-24, 2014.

Intel Corporation: "On D2DSS transmissions for inter-cell D2D discovery", 3GPP TSG RAN WG1 Meeting #78bis, R1-143758, Oct. 6-10, 2014.

Samsung: "Synchronization procedure for D2D discovery and communication", 3GPP TSG RAN WG1 Meeting #78bis, R1-143854, Oct. 6-10, 2014.

LG Electronics: "Details of Resource Allocation for D2D Synchronization", 3GPP TSG RAN WG1 Meeting #78bis, R1-144014, Oct. 6-10, 2014.

LG Electronics: "Evaluation results on the D2D synchronization procedure", 3GPP TSG RAN WG1 Meeting #78bis, R1-144019, Oct. 6-10, 2014.

LG Electronics: "Further Discussion on the Multi-carrier Issues in D2D", 3GPP TSG RAN WG1 Meeting #78bis, R1-144030, Oct. 6-10, 2014.

ITL Inc.: "Mutliplexing between D2D and WAN in a FDD band", 3GPP TSG RAN WG1 Meeting #78bis, R1-144254, Oct. 6-10, 2014.

Ericsson: "Inter-Carrier Aspects of D2D Discovery and Communication", 3GPP TSG RAN WG1 Meeting #78bis, R1-144320, Oct. 6-10, 2014.

Ericsson: "Receiver Behaviour for D2D Synchronization", 3GPP TSG RAN WG1 Meeting #78bis, R1-144321, Oct. 6-10, 2014.

R2-142240: 3GPP TSG-RAN WG2 #86, Seoul, Republic of Korea, May 19-23, 2014, Kyocera, "Inter-frequency discovery considerations," pp. 1-10.

R2-134285: 3GPP TSG-RAN2 Meeting #84, San Francisco, USA, Nov. 11-15, 2013, Intel Corporation, "Type 1 Resource Allocation for D2D discovery," pp. 1-5.

R4-145742: 3GPP TSG-RAN WG4 #72bis, Singapore, Oct. 6-Oct. 10, 2014, Qualcomm Incorporated, "RRM Requirements for D2D," pp. 1-6.

R1-142033: 3GPP TSG RAN WG1 Meeting #77, Seoul Korea, May 19-23, 2014, Intel Corporation, "Discussion on Type 2 D2D Discovery Procedure," pp. 1-5.

R1-143093: 3GPP TSG RAN WG1 #78, Dresden, Germany, Aug. 18-Aug. 22, 2014, Samsung, "RSRP based resource grouping for D2D type-1 discovery," pp. 1-7.

R1-142205, 3GPP TSG RAN WG1 Meeting #77 Seoul, Korea, May 19-23, 2014, Sharp, "Collision Avoidance Mechanism with Cellular Network for D2D Communication" (Year 2014) pp. 1-4.

ZTE: "Synchronization Design for D2D Broadcast Communication," 3GPP TSG-RAN WG1 #76, Feb. 10-14, 2014, R1-140269, XP050735819.

LG Electronics: "Discussion on resource allocation for D2D synchronization," 3GPP TSG RAN WG1 Meeting #76bis, Mar. 31-Apr. 4, 2014, R1-141356.

LG Electronics: "On the D2D-related information sharing between in-coverage UEs and out-coverage UEs," 3GPP TSG RAN WG1 Meeting #77, May 19-23, 2014, R1-142158.

LG Electronics: "Evaluation results on the D2D synchronization procedure," 3GPP TSG RAN WG1 Meeting #78, Aug. 18-22, 2014, R1-143191, XP050788668.

Huawei, HiSilicon: "Fina details of D2D synchronization signals," 3GPP TSG RAN WG1 Meeting #78bis, Oct. 6-10, 2014, R1-143699, XP050895026.

(56) References Cited

OTHER PUBLICATIONS

Sharp: "D2D and WAN co-existence considerations and D2D subframe bitmap limitations," 3GPP TSG RAN WG1 Meeting #78bis, Oct. 6-10, 2014, R1-143795.
ITRI: "Conditions of D2DSS Transmission Considering the Timing-forward," 3GPP TSG RAN WG1 Meeting #78bis, Oct. 6-10, 2014, R1-143901.
LG Electronics: "Details of Conditions for D2DSS Transmissions," 3GPP TSG RAN WG1 Meeting #78bis, Oct. 6-10, 2014, R1-144016.
Ericsson: "Transmitter Behaviour for D2D Synchronization," 3GPP TSG RAN WG1 Meeting #78bis, Oct. 6-10, 2014, R1-144322, XP050875577.
MCC Support: "Draft Report of 3GPP TSG RAN WG1 #78bis v0.2.0 (Ljubljana, Slovenia, Oct. 6-10, 2014)," 3GPP TSG RAN WG1 Meeting #79, Nov. 17-21, 2014, R1-14xxxx, XP 50895467A I.
Ericsson, ETRI, Qualcomm: "WF on UE Receiver Behaviour for D2D Discovery," AI 7.2.1.2.6, R1-144361.
"3rd Generation Partnership Project; Technical Specification Group Services and System Aspects; Service requirements for Machine-Type Communications (MTC); Stage 1 (Release 12)", 3GPP TS 22.368 V12.2.0 (Mar. 2013).
R1-142062:3GPP TSG RSN WG1 Meeting #77,Seoul, Korea, May 19-23, 2014,"D2D Synchronization Procedure",Alcatel-Lucent Shanghai Bell, Alcatel-Lucent, pp. 1-5.
Office Action of the U.S. Patent Office in U.S. Appl. No. 15/521,121, dated Aug. 15, 2019.
Office Action of the U.S. Patent Office in U.S. Appl. No. 15/521,042, dated Sep. 11, 2019.
Search Report of European Patent Office in Appl'n. No. 15852215.1, dated May 11, 2018.
Search Report of European Patent Office in Appl'n. No. 15853299.4, dated Jun. 18, 2018.
Search Report of European Patent Office in Appl'n. No. 15851782.1, dated Jun. 18, 2018.
Office Action of Japanese Patent Office in Appl'n. No. 2017-521581, dated May 22, 2018.
Office Action of Chinese Patent Office in Appl'n No. 201580057358, dated Sep. 20, 2019.
R2-154156: 3GPP TSG-RAN WG2 #91bis; Malmö, Sweden Oct. 9-15, 2015; Ericsson; on D2D gaps, pp. 1-4.
Office Action of the U.S. Pat. Appl. No. 15/521,121, dated Aug. 15, 2019.
Office Action of the U.S. Pat. Appl. No. 15/521,042, dated Sep. 11, 2019.

\* cited by examiner

FIG. 2
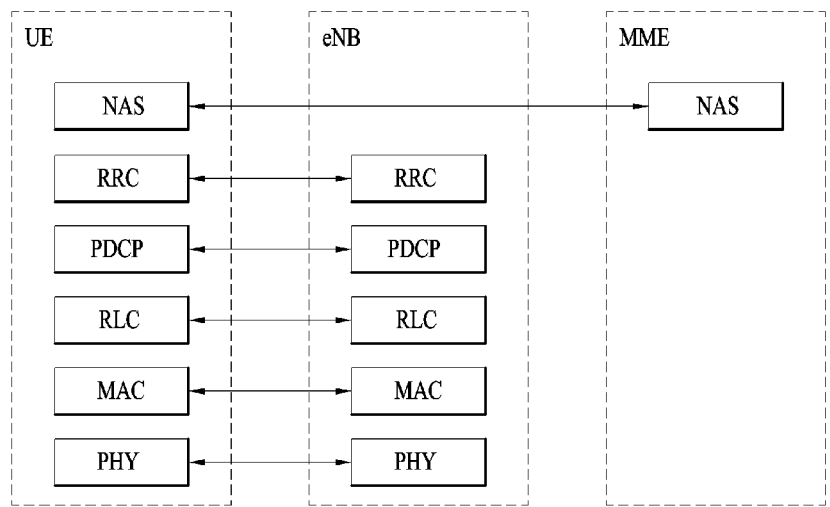
(a) Control-plane protocol stack
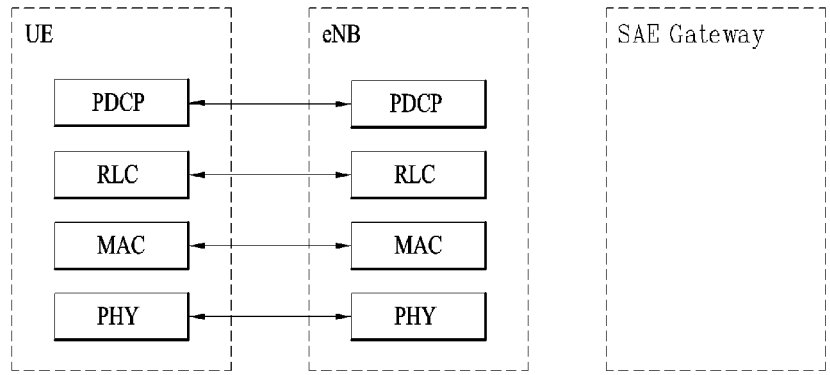
(b) User-plane protocol stack FIG. 8
(a) 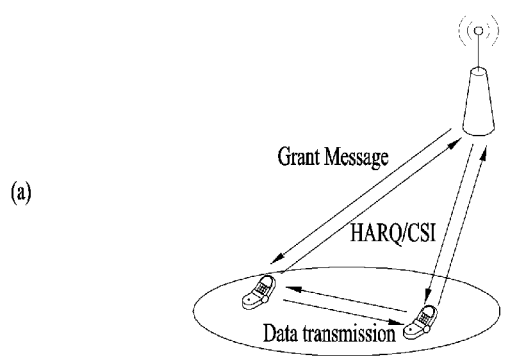
(b) 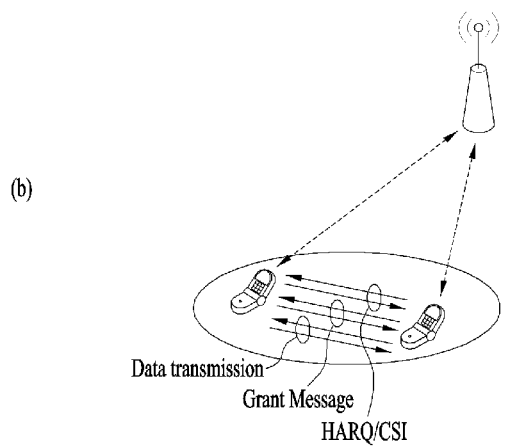

METHOD FOR TRANSMITTING AND RECEIVING D2D SIGNAL IN WIRELESS COMMUNICATION SYSTEM, AND APPARATUS THEREFOR

This application is a 35 USC § 371 National Stage entry of International Application No. PCT/KR2015/011158, filed on Oct. 21, 2015, and claims priority to U.S. Provisional Application Nos. 62/066,890 filed on Oct. 21, 2014, 62/076, 468 filed on Nov. 6, 2014, 62/077,888 filed on Nov. 10, 2014, 62/080,253 filed on Nov. 14, 2014, 62/154,738 filed on Apr. 30, 2015, 62/161,853 filed on May 14, 2015, 62/086,175 filed on Dec. 1, 2014, 62/146,177 filed on Apr. 10, 2015, and 62/150,869 filed on Apr. 22, 2015, which are hereby incorporated by reference in their entireties for all purposes as if fully set forth herein.

TECHNICAL FIELD

The present invention relates to a wireless communication system and, more specifically, to a method for transmitting and receiving a D2D signal in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a method for transmitting and receiving a D2D signal in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of transmitting a D2DSS (Device-to-Device Synchronization Signal) by a first UE (User Equipment) in a wireless communication system includes: determining a D2DSS transmission-related intention of the first UE; and transmitting the D2DSS to a second UE when the first UE has the D2DSS transmission-related intention, wherein the D2DSS is transmitted prior to a first scheduling assignment period when the first UE has the D2DSS transmission-related intention.

A determination may be made that the first UE has the D2DSS transmission-related intention when the first UE is within coverage of an eNB and the eNB signals D2DSS transmission.

A determination may be made that the first UE has the D2DSS transmission-related intention when the first UE is out of the coverage of the eNB and a PSBCH DMRS (Physical Sidelink Broadcast Channel Demodulation Reference Signal) measurement value is lower than a threshold value.

The D2DSS may be transmitted within a predetermined range prior to the first scheduling assignment period.

In another aspect of the present invention, a first UE transmitting a D2DSS in a wireless communication system includes: a radio frequency (RF) unit; and a processor, wherein the processor is configured to determine a D2DSS transmission-related intention of the first UE and to transmit the D2DSS to a second UE when the first UE has the D2DSS transmission-related intention, wherein the D2DSS is transmitted prior to a first scheduling assignment period when the first UE has the D2DSS transmission-related intention.

Advantageous Effects

According to embodiments of the present invention, transmission and reception of D2D signals can be efficiently performed in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 illustrates structures of a control plane and a user plane of a radio interface protocol between a UE and an E-UTRAN based on the 3GPP radio access network standard;

FIG. 8 is a reference diagram illustrating D2D communication;

BEST MODE

Figure 1:
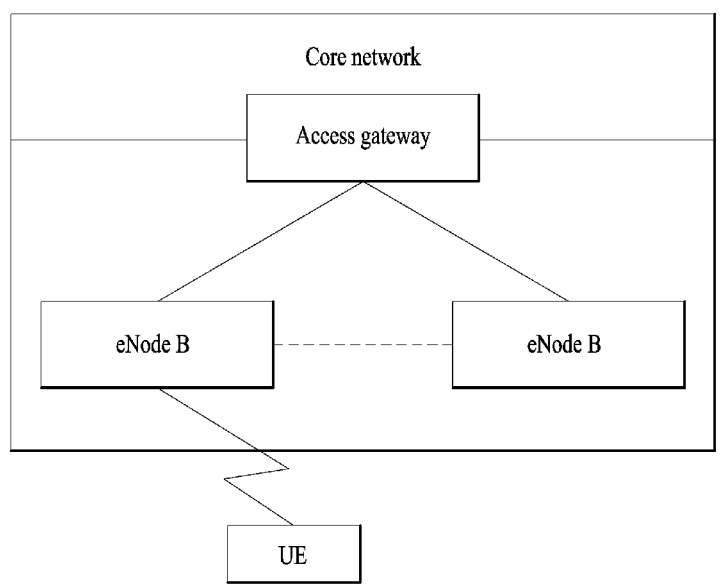
FIG. 1 illustrates an E-UMTS network structure as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers (RBs) to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
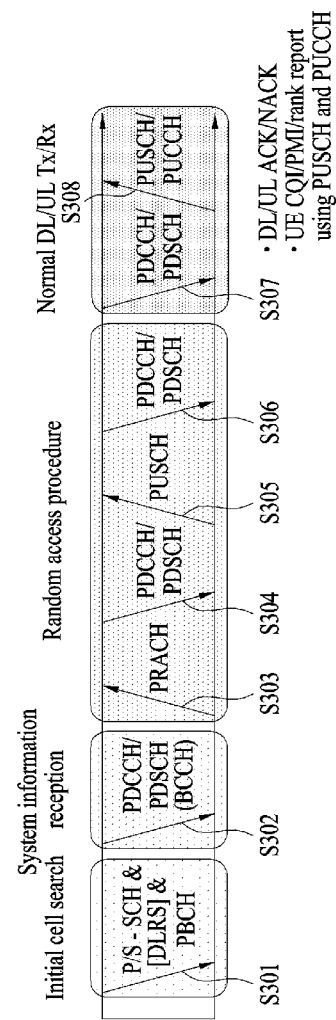
FIG. 3 illustrates physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and request Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK); negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
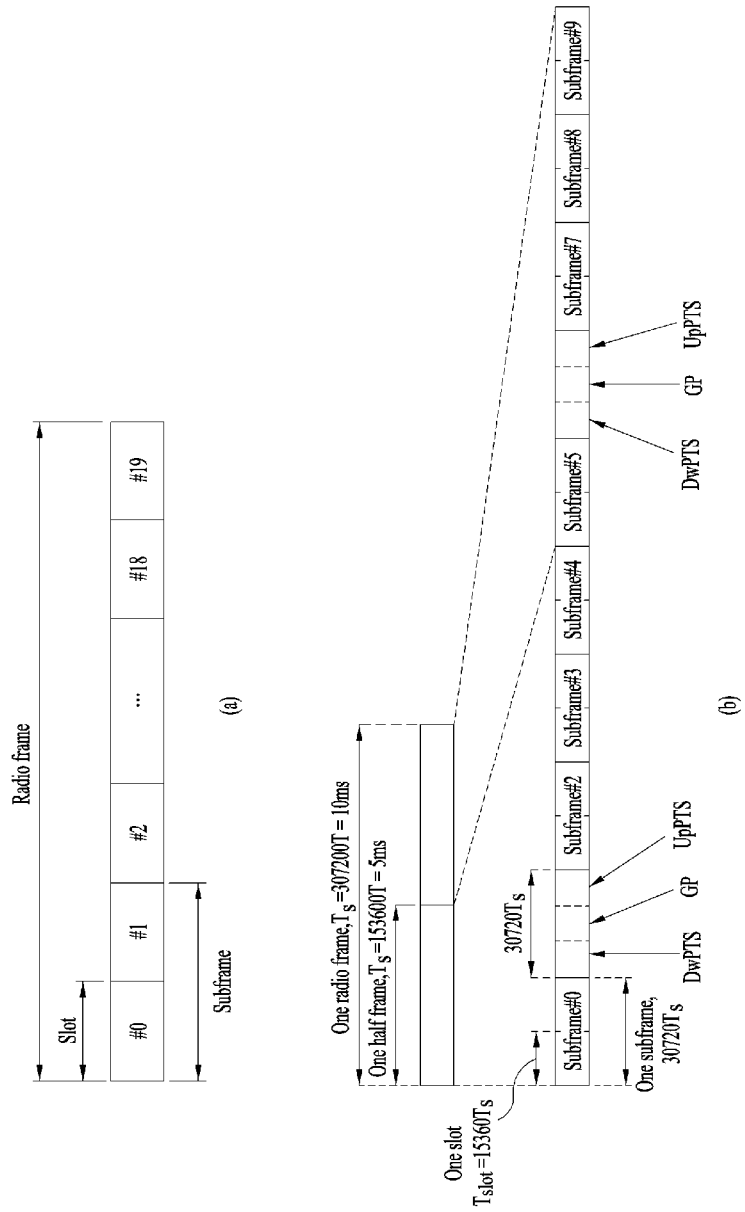
FIG. 4 illustrates a structure of a radio frame used in an LTE system.

FIG. 4 illustrates a structure of a radio frame used in LTE.

Referring to FIG. 4, in a cellular OFDM wireless packet communication system, transmission of an uplink/downlink data packet is performed on a subframe by subframe basis and one subframe is defined as a specific period including a plurality of OFDM symbols. 3GPP LTE standards support a type-1 radio frame structure applicable to FDD (Frequency Division Duplex) and a type-2 radio frame structure applicable to TDD (Time Division Duplex).

FIG. 4(a) illustrates the type-1 radio frame structure. A downlink radio frame includes 10 subframes, each of which includes two slots in the time domain. A time taken to transmit one subframe is called a TTI (transmission time interval). For example, one subframe may be 1 ms in length and one slot may be 0.5 ms in length. One slot includes a plurality of OFDM symbols in the time domain and a plurality of resource blocks (RBs) in the frequency domain. 3GPP LTE uses OFDMA on downlink and thus an OFDM symbol refers to one symbol period. An OFDM symbol may also be referred to as an SC-FDMA symbol or a symbol period. An RB as a resource allocation unit may include a plurality of consecutive subcarriers in one slot.

The number of OFDM symbols included in one slot may depend on a CP (Cyclic Prefix) configuration. The CP includes an extended CP and a normal CP. For example, when the OFDM symbol is configured according to the normal CP, the number of OFDM symbols included in one slot may be 7. When the OFDM symbol is configured according to the extended CP, the length of one OFDM symbol increases and thus the number of OFDM symbols included in one slot is less than that in the case of the normal CP. In the extended CP, for example, the number of OFDM symbols included in one slot can be 6. In the case of unstable channel state such as rapid movement of a UE at a high speed, the extended CP can be used to reduce inter-symbol interference.

When the normal CP is used, one slot includes 7 OFDM symbols and thus one subframe includes 14 OFDM symbols. Here, a maximum of three OFDM symbols located in a front portion of each subframe may be allocated to a PDCCH (Physical Downlink Control Channel) and the remaining symbols may be allocated to a PDSCH (Physical Downlink Shared Channel).

FIG. 4(b) illustrates the type-2 radio frame structure. The type-2 radio frame includes two half frames. Each half frame is composed of four normal subframes each of which includes two slots and a special subframe including two slots, a DwPTS (Downlink Pilot Time Slot), a GP (Guard Period) and a UpPTS (Uplink Pilot Time Slot).

In the special subframe, the DwPTS is used for initial cell search, synchronization or channel estimation in a UE. The UpPTS is used for channel estimation and uplink transmission synchronization of a UE in a BS. That is, the DwPTS is used for downlink transmission and the UpPTS is used for uplink transmission. Particularly, the UpPTS is used for transmission of a PRACH preamble or SRS. The GP is used to eliminate interference generated on uplink due to multipath delay of a downlink signal between uplink and downlink.

With respect to the special subframe, a configuration is currently defined in 3GPP standard document as shown in Table 1. Table 1 shows DwPTS and UpPTS when $T_s=1/(15000\times2048)$ and the remaining period is set to a GP.

TABLE 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

The type-2 radio frame structure, that is, an uplink/downlink (UL/DL) configuration in a TDD system is shown in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe and S represents the special subframe. In addition, Table 2 shows downlink-to-uplink switching periodicity in a UL/DL subframe configuration in each system.

The aforementioned radio frame structure is merely an example and the number of subframes included in a radio frame, the number of slots included in a subframe and the number of symbols included in a slot may be varied.

Figure 5:
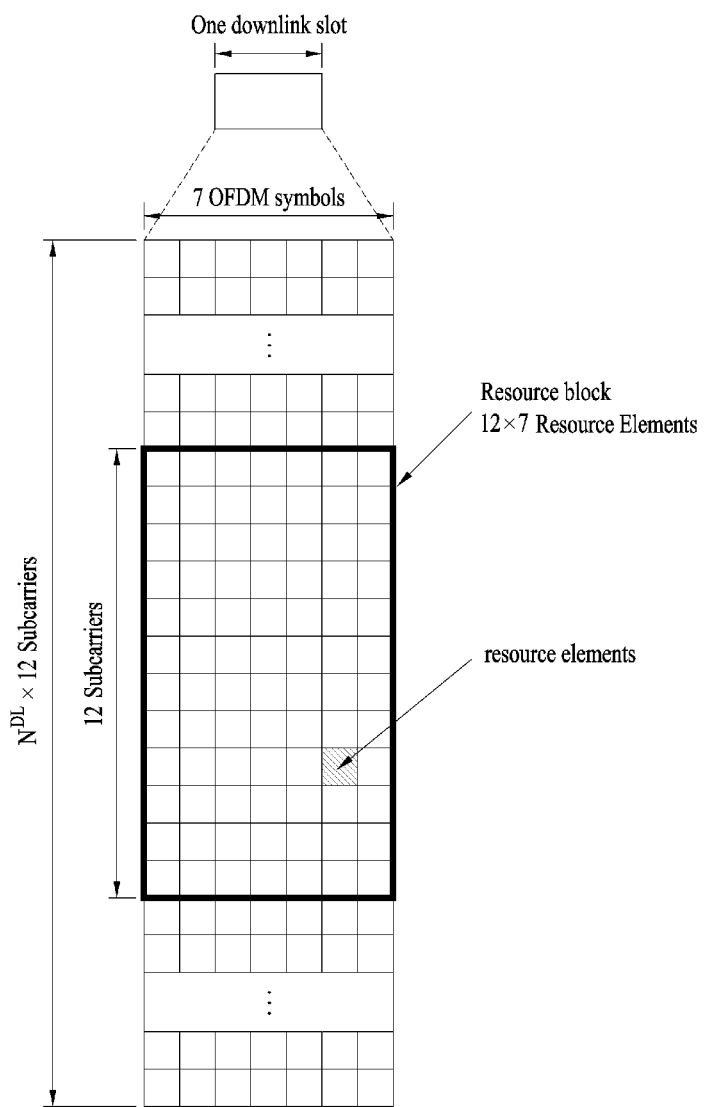
FIG. 5 illustrates a resource grid with respect to a downlink slot.

FIG. 5 illustrates a resource grid with respect to a downlink slot.

Referring to FIG. 5, the downlink slot includes $N_{symb}^{DL}$ OFDM symbols in the time domain. Since each RB includes $N_{sc}^{RB}$ subcarriers, the downlink slot includes $N_{RB}^{DL} \times N_{sc}^{RB}$ subcarriers in the frequency domain. While FIG. 5 shows that the downlink slot includes 7 OFDM symbols and the RB includes 12 subcarriers, the number of OFDM symbols and the number of subcarriers are not limited thereto. For example, the number of OFDM symbols included in the downlink slot may be varied according to CP (Cyclic Prefix) length.

Each element on the resource grid is referred to as an RE (Resource Element) and one RE is indicated by one OFDM symbol index and one subcarrier index. One RB is composed of $N_{symb}^{DL} \times N_{sc}^{RB}$ REs. The number of RBs, $N_{RB}^{DL}$, included in the downlink slot depends on a downlink transmission bandwidth set in the corresponding cell.

Figure 6:
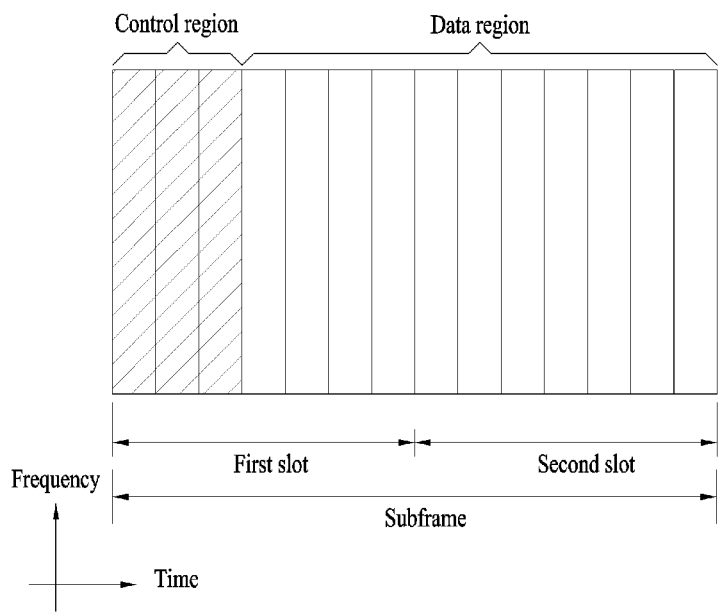
FIG. 6 illustrates a structure of a downlink subframe.

FIG. 6 illustrates a downlink subframe structure.

Referring to FIG. 6, up to three (or four) OFDM symbols at the start of the first slot in a downlink subframe are used for a control region to which control channels are allocated and the other OFDM symbols of the downlink subframe are used for a data region to which a PDSCH is allocated. Downlink control channels used in LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to uplink transmission.

Control information carried on the PDCCH is called downlink control information (DCI). The DCI includes uplink resource allocation information and other control information for a UE or a UE group. For example, the DCI includes downlink/uplink scheduling information, an uplink transmit (Tx) power control command, etc.

The PDCCH carries transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, a Tx power control command, activity indication information of voice over Internet protocol (VoIP), and the like. A plurality of PDCCHs can be transmitted in the control region. The UE is able to monitor a plurality of PDCCHs. The PDCCH is transmitted on an aggregation of one or a plurality of consecutive control channel elements (CCEs). The CCE is a logic allocation unit used to provide the PDCCH with a coding rate based on a radio channel state. The CCE corresponds to a plurality of resource element groups (REGs). The format of the PDCCH and the number of bits of the PDCCH are determined according to the number of CCEs. An eNB determines the PDCCH format according to the DCI to be transmitted to a UE and attaches cyclic redundancy check (CRC) to the control information. The CRC is masked with an identifier (e.g., radio network temporary identifier (RNTI)) depending on usage of the PDCCH or an owner of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI).

Figure 7:
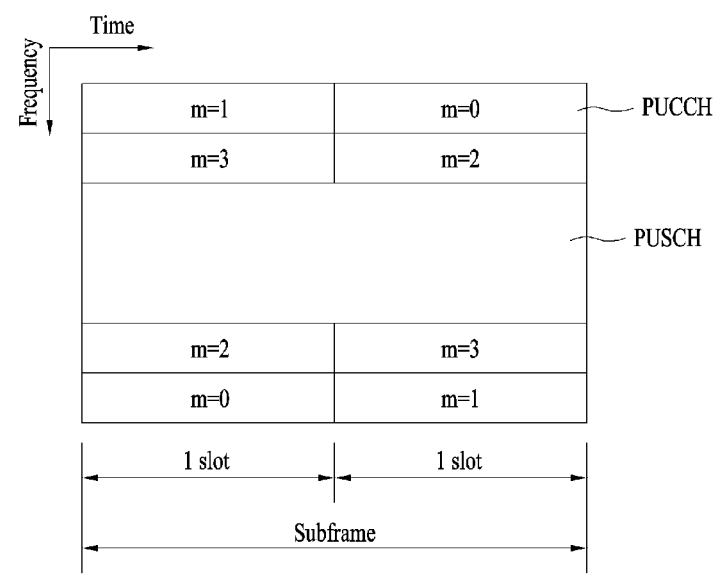
FIG. 7 illustrates a structure of an uplink subframe.

FIG. 7 illustrates a structure of an uplink subframe used in LTE.

Referring to FIG. 7, an uplink subframe includes a plurality (e.g., 2) of slots. The number of SC-FDMA symbols included in the slot may vary depending on the CP length. The uplink subframe is divided into a control region and a data region in the frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH can be used to transmit the following control information.

SR (scheduling request): Information used to request UL-SCH resources. This is transmitted using an on-off keying (OOK) scheme.

HARQ ACK/NACK: Response signal with respect to a downlink data packet on PDSCH. This indicates whether the downlink data packet is successfully received. 1-bit ACK/NACK is transmitted in response to a single downlink codeword and 2-bit ACK/NACK is transmitted in response to two downlink codewords.

CSI (channel state information): Feedback information with respect to a downlink channel. The CSI includes a channel quality indicator (CQI) and MIMO-related (multiple input multiple output) feedback information includes a rank indicator (RI), a precoding matrix indicator (PMI) and a precoding type indicator (PTI). 20 bits are used in each subframe.

The amount of UCI that can be transmitted in a subframe by a UE depends on the number of SC-FDMA symbols available for control information transmission. The SC-FDMA symbols available for control information transmission mean the remaining SC-FDMA symbols except SC-FDMA symbols for reference signal transmission in a subframe. In case of a subframe having a sounding reference signal (SRS) configured therein, a last SC-FDMA symbol of the subframe is also excluded. The reference signal is used for coherent detection of the PUCCH.

A description will be given of D2D (device-to-device) communication.

D2D communication can be divided into communication assisted by a network/coordination station (e.g., BS) and communication that is not assisted. FIG. 8 is a reference diagram illustrating D2D communication.

FIG. 8(a) illustrates a scheme in which a network/coordination station intervenes in transmission and reception of a control signal (e.g., grant message), HARQ, channel state information and the like and only data is transmitted and received between UEs that perform D2D communication. FIG. 8(b) illustrates a scheme in which a network provides only minimum information (e.g., D2D connection information that can be used in the corresponding cell) and UEs performing D2D communication establish links and transmit and receive data.

A method of efficiently configuring D2D synchronization signal (D2DSS) (transmission/reception) resources and D2DSS transmission conditions in an environment in which D2D communication is performed according to the present invention will be described on the basis of the above description.

Here, D2D communication refers to direct communication between UEs using a radio channel. A UE generally refers to a user terminal and may be regarded as a UE to which the present invention is applicable when network equipment such as an eNB transmits/receives signals according to communication scheme between UEs. Further, WAN DL communication may refer to communication through which an eNB transmits an (E)PDCCH, a PDSCH, a CRS, a CSI-RS and the like to a UE and WAN communication may refer to communication through which a UE transmits a PRACH, a PUSCH, a PUCCH and the like to an eNB.

While the present invention will be described on the basis of 3GPP LTE for convenience of description, the present invention is applicable to systems other than 3GPP LTE.

Furthermore, a UE that transmits D2D signals is defined as "D2D TX UE" and a UE that receives D2D signals is defined as "D2D RX UE" for convenience of description.

In addition, embodiments of the present invention may be extended and applied to i) a case in which some D2D UEs joining in D2D communication are within network coverage and the remaining D2D UEs are outside network coverage (D2D discovery/communication of partial network coverage), ii) a case in which all D2D UEs joining in D2D communication are within network coverage (D2D discovery/communication within network coverage) and/or iii) a case in which all D2D UEs joining D2D communication are outside network coverage (D2D discovery/communication outside network coverage (for public safety only)).

A description will be given of resource configuration/allocation when D2D communication is performed prior to detailed description of the present invention.

When a UE directly communicates with another UE using a radio channel, in general, a resource unit (RU) corresponding to a specific resource is selected within a resource pool that refers to a set of contiguous resources and a D2D signal is transmitted using the RU (i.e., operation of a D2D TX UE). Information on a resource pool in which the D2D TX UE can transmit a signal is signaled to a D2D RX UE and the D2D RX UE detects a signal of the D2D TX UE. Here, the resource pool information may be i) signaled by an eNB when the D2D TX UE is within the coverage of the eNB and ii) signaled by another UE or determined as predetermined resources when the D2D TX UE is outside the coverage of the eNB.

In general, a resource pool is composed of a plurality of RUs and each UE may select one or more RUs and use them to transmit D2D signals thereof.

Figure 9:
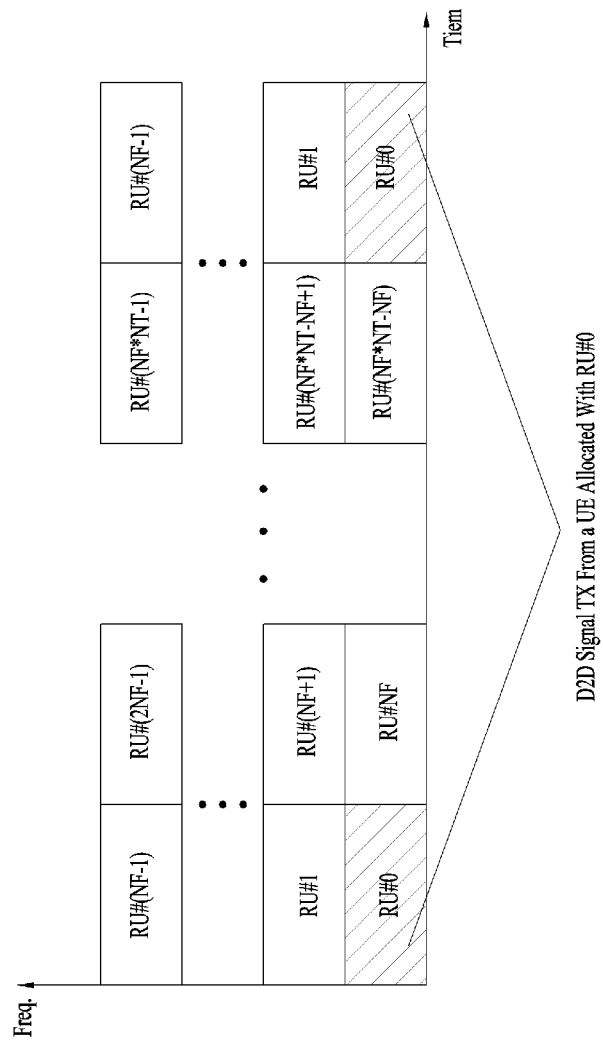
FIG. 9 is a reference diagram illustrating an example of a configuration of resource units (RUs) for D2D communication.

FIG. 9 is a reference diagram illustrating an example of a configuration of RUs for D2D communication. The diagram shows that all frequency resources are divided into NF resources and all time resources are divided into NT resources to define a total of NF*NT RUs. Here, it can be considered that the corresponding resource pool is repeated at an interval of NT subframes. Characteristically, one RU may periodically appear as illustrated in FIG. 9. Further, the index of a physical RU to which a logical RU is mapped may be varied with time in a predetermined pattern in order to obtain diversity effect in the time or frequency domain. In such an RU configuration, a resource pool may refer to a set of RUs that can be used for a UE to transmit D2D signals.

Furthermore, the aforementioned resource pool may be subdivided. First of all, the resource pool can be classified according to D2D signal content transmitted in the resource pool. For example, D2D signal content can be classified as follows and a resource pool may be configured per D2D signal content.

Scheduling assignment (SA): refers to a signal including information such as positions of resources used for each D2D TX UE to transmit a trailing D2D data channel and an MCS (Modulation and Coding Scheme) or MIMO transmission scheme necessary to demodulate other data channels. This signal can be multiplexed with D2D data and transmitted in the same RU. In this case, an SA resource pool may refer to a resource pool in which the SA is multiplexed with D2D data and transmitted. This is referred to as an "SA pool" in the present invention for convenience of description.

D2D data channel: refers to a resource pool used for a D2D TX UE to transmit user data using resources designated through the SA. When the D2D data channel can be multiplexed with SA information and transmitted in the same RU, only the D2D data channel exclusive of the SA information is transmitted in the resource pool for the D2D data channel. In other words, resource elements (REs) used to transmit SA information in an individual RU in the SA resource pool are used to transmit D2D data in the resource pool of the D2D data channel. Hereinafter, this is referred to as a "data pool" in the present invention for convenience of description.

Discovery message: refers to a resource pool for a message through which a D2D TX UE transmits the ID thereof such that a neighbor UE can discover the D2D TX UE. This is referred to as a "discovery pool" in the present invention for convenience of description.

For the same D2D signal content, different resource pools may be used depending on D2D signal transmission/reception properties. For example, even the same D2D data channel or discovery message may be divided into different resource pools according to i) a D2D signal transmission timing determination method (e.g., a method of transmitting a D2D signal at synchronization reference signal reception timing or a method of applying a specific TA (Timing Advance) and transmitting a D2D signal at synchronization reference signal reception timing, ii) a resource allocation method (e.g., a method through which a cell designates transmission resources for an individual signal to an individual D2D TX UE or a method through which an individual D2D TX UE selects individual signal transmission resources within a pool or iii) a signal format (e.g., the number of symbols occupied by each D2D signal in one subframe or the number of subframes used to transmit one D2D signal).

Furthermore, a resource allocation method for D2D data channel transmission may be divided into the following two modes.

Mode 1: refers to a method through which a cell directly designates resources to be used for transmission of SA and D2D data to an individual D2D TX UE. Consequently, the cell can correctly recognize a UE which will transmit a D2D signal and resources which will be used by the UE to transmit the D2D signal. However, since designation of D2D resources for every D2D signal transmission may cause excessive signaling overhead, operation may be performed to allocate a plurality of SAs and/or data transmission resources through one-time signaling.

Mode 2: refers to a method through which an individual D2D TX UE selects appropriate resources within contiguous SA and data related resource pools configured by a cell for multiple D2D TX UEs and transmits SA and data. As a result, the cell cannot correctly recognize a UE which will perform D2D transmission and resources which will be used for D2D transmission.

Furthermore, a resource allocation method for discovery message transmission may be divided into the following two types.

Type 1: a discovery procedure when resources for non-UE-specific basis discovery signal transmission are allocated. Here, the resources may be for all UEs or in a group of UEs.

Type 2: a discovery procedure when resources for UE-specific basis discovery signal transmission is allocated.

Type 2A: a resource is allocated per specific transmission instance of each discovery signal.

Type 2B: a resource is semi-persistently allocated for discovery signal transmission.

Figure 10:
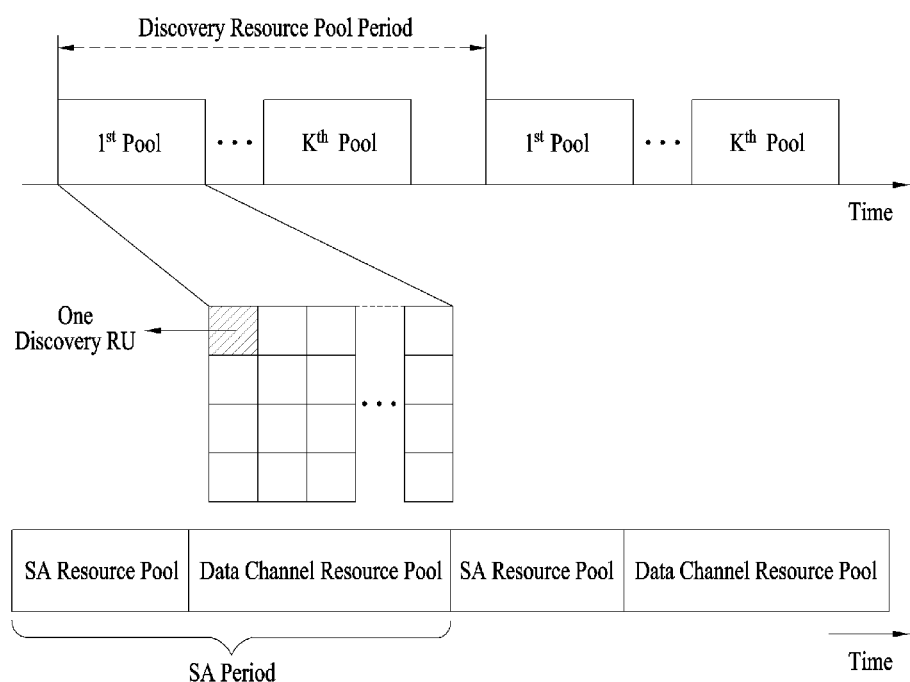
FIG. 10 illustrates a case in which a discovery message related resource pool periodically appears.

FIG. 10 illustrates a case in which a discovery message related resource pool (referred to hereinafter as "discovery resource pool") periodically appears. In FIG. 10, a period in which the resource pool appears is referred to as a "discovery resource pool period". Further, specific discovery resource pools from among a plurality of discovery resource pools configured in (one) discovery resource pool period may be defined as serving cell related discovery transmission/reception resource pools and other (remaining) discovery resource pools may be defined as neighbor cell related discovery reception resource pools.

A D2DSS resource configuration method and D2DSS transmission conditions proposed by the present invention will be described on the basis of the above description.

First of all, a case of in-coverage (or in-network (in-NW)) UEs will be described.

A maximum of one D2DSS resource may be configured per cell for in-coverage UEs. Here, the D2DSS resource includes a periodically appearing subframe that satisfies the following conditions i) and ii). A D2DSS may be transmitted in the periodically appearing subframe. (For example, an eNB uses resources that are not used for D2DSS transmission (for WAN communication)). i) The period of the D2DSS resource is identical in in-coverage and out-of-coverage cases and may be previously fixed to 40 ms. ii) a timing offset in units of subframe may be set when the D2DSS resource is configured and a D2DSS resource offset (e.g., a subframe based timing offset of a serving cell for SFN #0) of neighbor cells may be signaled through SIB.

A UE, which transmits SA or D2D data, transmits the D2DSS in each subframe that satisfies (part of or all) the following conditions in the D2DSS resource.

A subframe that does not collide with cellular transmission from the viewpoint of the UE A subframe that satisfies predefined conditions such as UE capability A subframe within the SA or D2D data period in which SA or data is transmitted A subframe that satisfies other predefined conditions when the UE is in an RRC_connected state and the eNB instructs D2DSS transmission to be initiated (through dedicated signaling) and/or the UE does not transmit the SA or D2D data in a subframe within the SA or D2D data period and/or satisfies (part or all of) the following conditions An RSRP threshold value for D2D communication related D2DSS transmission is set through SIB. Here, the threshold value may be set to one of $\{-\infty, -115 \ldots -60$ (increasing by 5), $+\infty\}$ dBm, for example.

The RSRP value of the UE is lower than the threshold value.

The eNB does not instruct D2DSS transmission to be stopped (through dedicated signaling).

For each discovery pool, a discovery UE transmits a D2DSS in the corresponding subframe of each discovery pool if (part or all of) the following conditions are satisfied when the first subframe is the D2DSS resource. When the first subframe is not the D2DSS resource, the discovery UE transmits the D2DSS in the corresponding subframe if (part or all of) the following conditions are satisfied in the closest D2DSS resource present prior to the discovery pool start time.

A subframe that does not collide with cellular transmission from the viewpoint of the UE The UE does not perform scanning for other D2DSSs.

A subframe that satisfies predefined conditions such as UE capability

The UE transmits a discovery message within the discovery pool.

The UE is in an RRC_connected state and the eNB instructs D2DSS transmission to be initiated (through dedicated signaling) and/or all (or part of) the following conditions are satisfied.

An RSRP threshold value for D2D discovery related D2DSS transmission is set through SIB. Here, the threshold value may be set to one of $\{-\infty, -115 \ldots -60$ (increasing by 5), $+\infty\}$ dBm, for example.

The RSRP value of the UE is lower than the threshold value.

The eNB does not instruct D2DSS transmission to be stopped (through dedicated signaling).

An out-of-coverage (or out-network (out-NW) UE will be described. The out-of-coverage UE cannot transmit a D2DSS in two or more D2DSS resources. Here, two D2DSS resources are used for out-of-coverage, for example. D2DSS resource positions may be previously set or signaled (with respect to DFN #0 (or on the basis of DFN #0)), for example.

For example, when a D2D RX UE receives neighbor cell related synchronization error information of w1/w2 (through predefined higher layer signaling), the D2D RX UE assumes a discovery reference synchronization window having a size of ±w1/±w2 for a neighbor cell D2D resource (and/or a neighbor cell discovery resource pool) (refer to Table 3).

TABLE 3

Figure 11:
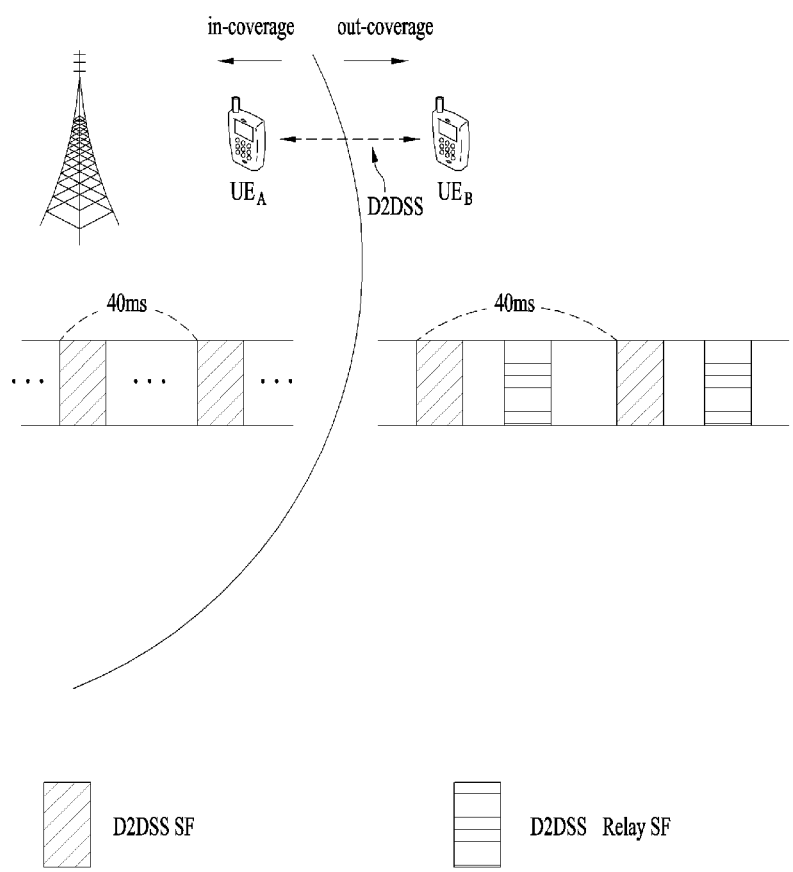
FIG. 11 is a reference diagram illustrating a D2DSS SF configuration and a D2DSS relay SF with respect to an in-coverage UE and an out-of-coverage UE.

If higher layer indicates w1 in a given neighbor cell, UE may assume for the purpose of discovery a reference synchronization window of size +/−w1 ms for that neighbor cell with respect to neighbor cell D2DSS resource
w1 is a fixed value and decided
UE may assume D2DSS is transmitted in that cell
If higher layer indicates w2 in a given neighbor cell, UE may assume for the purpose of discovery a reference synchronization window of size +/−w2 ms for that neighbor cell with respect to neighbor cell discovery resource
Exact value of w2 is decided
RAN1 recommend w2 as not greater than CP length (of the order of CP length)
UE expects that D2DSS indicated by the resource pool configuration appears only within signaled reference synchronization window FIG. 11 is a reference diagram illustrating D2DSS SF configuration and D2DSS relay SF for the aforementioned in-coverage UE and out-of-coverage UE.

Referring to FIG. 11, a maximum of one D2DSS resource (e.g., D2DSS SF) may be configured per cell for an in-coverage UE (e.g., $UE_A$) present within the coverage of an eNB. For an out-of-coverage UE present outside the coverage of the eNB, (another) D2DSS resource (e.g., D2DSS relay SF) for D2DSS relay may be configured along with (one) D2DSS resource aligned with the D2DSS resource for the in-coverage UE.

Figure 12:
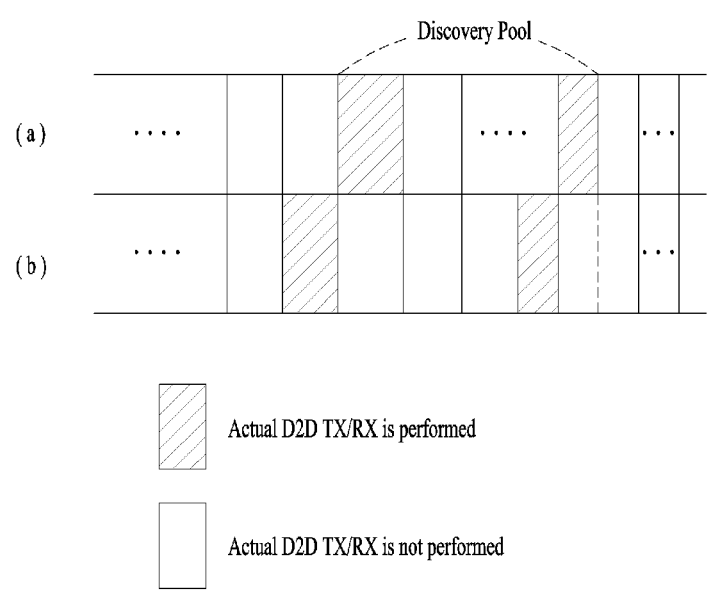
FIG. 12 illustrates positions of resource pools carrying a D2DSS.

FIG. 12 illustrates positions of discovery pools in which a D2DSS is transmitted. Referring to FIG. 12, the D2DSS can be transmitted in the first subframe of a discovery pool (a) or a subframe corresponding to the closest D2DSS resource prior to discovery pool start time (b).

D2DSS transmission conditions may be different for the in-coverage UE and the out-of-coverage UE. For example, i) D2DSS transmission can be instructed by the eNB through dedicated signaling or ii) D2DSS transmission can be determined according to (previously set or designated) RSRP standards in the case of the in-coverage UE. In the case of the out-of-coverage UE, for example, D2DSS transmission can be determined on the basis of (energy) measurement/detection with respect to a PSBCH (Physical Sidelink Broadcast Channel) DMRS. Here, is a signal (e.g., a PSBCH DMRS) equal to or greater than a predetermined threshold value is not measured/detected (within a predetermined area/distance), for example, the UE performs D2DSS transmission (as an independent synchronization source (ISS)) upon determining that there is no synchronization source (within the predetermined area/distance). Although only discovery (pool) related D2DSS transmission has been described with reference to FIG. 12 for convenience of description, the present invention can be extended and applied to D2D communication (e.g., SA and D2D data) (pool) related D2DSS transmission.

Based on the above description, operation of an in-NW UE will be described first. D2DSS transmission can be an optional characteristic of D2D capable UEs. Accordingly, it is desirable that only D2DSS capable UEs transmit a D2DSS, for example.

A discovery UE transmits a D2DSS in a single subframe in each discovery period. This operation can be performed according to discovery only for in-NW UEs. That is, an in-NW UE is synchronized with a cell and thus frequency error between a TX UE and an RX UE is limited and D2DSS detection in a single subframe is sufficiently reliable. In this case, additional conditions for D2DSS scanning are not necessary because the serving cell provides D2DSS resources of neighbor cells and D2DSS resources of a plurality of cells can be separated in the time domain according to network configuration. Furthermore, a UE may not transmit a discovery signal in a resource pool because of collision with WAN UL TX.

Accordingly, it is necessary to change one of the aforementioned discovery related D2DSS transmission conditions, "the UE transmits a discovery message in the discovery pool", to "the UE intends to transmit a discovery message in the discovery pool".

In addition, whether a D2DSS needs to be transmitted prior to SA transmission may be considered with respect to communication. (Here, data cannot be transmitted prior to SA transmission.) This is because D2DSS resources may not be present before an SA subframe within the SA/data period. In this case, SA can be transmitted first and then the D2DSS can be transmitted. That is, conditions similar to the aforementioned discovery (related D2DSS transmission) conditions may be additionally set if synchronization is needed prior to SA reception.

In this case, however, D2DSS transmission in a single subframe may not provide reliable synchronization capability to out-NW UEs that may have a large initialization frequency offset. Accordingly, it is desirable that the D2DSS be transmitted in a plurality of subframes prior to SA transmission. Here, time limitation may be needed for preceding D2DSS transmission because it is difficult for a UE to correctly predict intention of SA transmission when there is a large time gap between a D2DSS subframe and an SA subframe.

Further, whether to transmit the D2DSS when SA or data is not transmitted in the SA/data period will be described. Since the D2DSS for communication needs to be received by out-NW UEs, operation for discovery needs to be different from operation for communication. Specifically, out-NW UEs may have large frequency error and thus D2DSS detection capability reliability needs to be high.

For rapid synchronization of out-NW UEs, in-NW UEs need to continuously transmit the D2DSS for at least a predetermined interval. Accordingly, the out-NW UEs can detect the D2DSS at least once in a set of continuous D2DSS transmission subframes.

Furthermore, it is necessary for out-NW UEs to select synchronization reference, to perform D2DSS measurement for determination of whether D2DSS transmission conditions are satisfied and to average D2DSS subframes through appropriate (or reliable) measurement, and thus it is desirable to avoid random on-off of D2DSS transmission at intervals of 40 ms.

To this end, accordingly, a UE may be configured to transmit the D2DSS even when the UE does not transmit SA or D2D data in the SA/data period if a predetermined specific condition is satisfied. This is called "condition for continuing D2DSS transmission" hereinafter.

The "condition for continuing D2DSS transmission" can be based on the principle that a UE continuously (or consecutively) performs D2DSS transmission for a (previously set) time period if the UE has transmitted the D2DSS. This principle can guarantee continuous D2DSS transmission that helps D2DSS detection and measurement of out-NW UEs.

Figure 13:
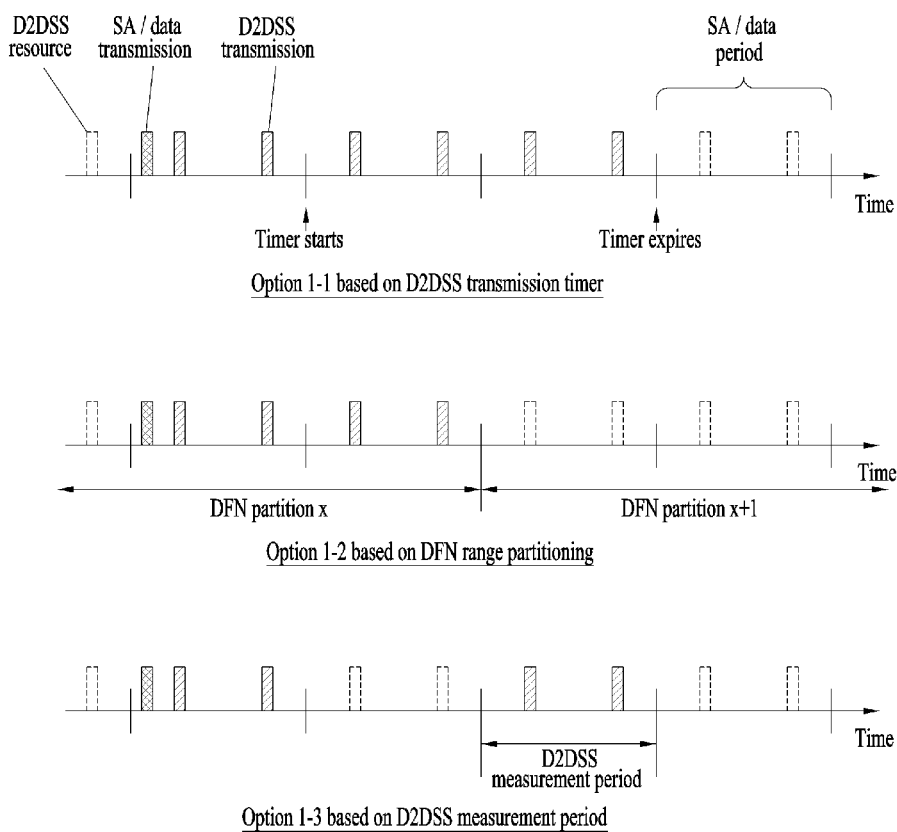
FIG. 13 is a reference diagram illustrating options related to the present invention.

Accordingly, the present invention can consider the following options 1-1 to 1-3. FIG. 13 is a reference diagram illustrating options 1-1 to 1-3. A description will be given with reference to FIG. 13.

Option 1-1: "D2DSS transmission timer" can be defined.
  If a UE transmits the D2DSS in subframe # n under the condition that "the subframe is within the SA or D2D data period in which SA or data is transmitted", the UE can continuously (or consecutively) transmit the D2DSS in subframes # n+40, # n+80, # n+K*40 even when there is no SA/data to be transmitted. Here, K corresponds to the "D2DSS transmission timer".

Option 1-2: The entire DFN range can be divided into a plurality of time partitions. When the DFN range is assumed to be 0 to 1,023 (i.e., one D2D frame corresponds to 10 ms), a DFN partition x includes D2D frames x, x+1, x+M−1 (i.e., when the DFN range is divided into 1024/M DFN partitions). If a UE transmits the D2DSS in a subframe included in DFN partition x, the UE continuously (or consecutively) transmits the D2DSS in the remaining D2DSS subframes in the DFN partition x. This option has the advantage that an RX UE can be aware of a potential D2DSS transmission related time instance after decoding DFN in an associated (or related) PD2DSCH.

Option 1-3: "D2DSS measurement period" can be defined, and a UE, which has transmitted the D2DSS in a specific subframe, transmits the D2DSS in a D2DSS measurement period related to the specific subframe. For example, a D2DSS measurement period closest to the specific subframe in which the UE transmits the D2DSS can be defined as associated with the specific subframe.

With respect to the aforementioned condition, the UE needs to clarify transmission of no D2DSS in subframes that do not satisfy D2DSS transmission conditions. The eNB may recognize at least a subset of subframes in which the D2DSS is not transmitted and use D2DSS resources in such subframes for cellular (communication) transmission.

That is, in the case of in-coverage UEs,
  a UE, which transmits SA or D2D data, transmits the D2DSS in each subframe that satisfies (part or all of) the following conditions within a D2DSS resource.
  A subframe that does not collide with cellular transmission from the viewpoint of the UE
  D2DSS capable UE
  A subframe within the SA or D2D data period in which SA or data is transmitted, a subframe within X ms from a subframe in which the UE intends to transmit SA and/or a subframe satisfying "condition for continuing D2DSS transmission"
  The UE is in an RRC_connected state and the eNB instructs D2DSS transmission to be initiated (through dedicated signaling) and/or all (or part) of the following conditions are satisfied.
  An RSRP threshold value for D2D communication related D2DSS transmission is set through SIB. Here, the threshold value may be set to one of {−∞, −115 . . . −60 (increasing by 5), +∞} dBm, for example.
  The RSRP value of the UE is lower than the threshold value.
  The eNB does not instruct D2DSS transmission to be stopped (through dedicated signaling).
  For each discovery pool, a discovery UE transmits a D2DSS in the corresponding subframe of each discovery pool if (part or all of) the following conditions are satisfied when the first subframe is the D2DSS resource. When the first subframe is not the D2DSS resource, the discovery UE transmits the D2DSS in the corresponding subframe if (part or all of) the following conditions are satisfied in the closest D2DSS resource present prior to discovery pool start time.

A subframe that does not collide with cellular transmission from the viewpoint of the UE D2DSS capable UE The UE intends to transmit a discovery message in a discovery pool.

The UE is in an RRC_connected state and the eNB instructs D2DSS transmission to be initiated (through dedicated signaling) and/or all (or part) of the following conditions are satisfied.

An RSRP threshold value for D2D communication related D2DSS transmission is set through SIB. Here, the threshold value may be set to one of $\{-\infty, -115 \ldots -60$ (increasing by 5), $+\infty\}$ dBm, for example.

The RSRP value of the UE is lower than the threshold value.

The eNB does not instruct D2DSS transmission to be stopped (through dedicated signaling).

When the above conditions are not satisfied, the UE does not transmit the D2DSS.

In addition, for the "condition for continuing D2DSS transmission," the following three options, that is, options 2-1 to 2-3, may be considered.

Option 2-1: A D2DSS timer is defined and a UE, which has transmitted the D2DSS under the SA/data transmission conditions, may maintain D2DSS transmission without transmitting SA/data until the timer expires.

Option 2-2: The DFN range is divided into a plurality of DFN partitions and a UE, which has transmitted the D2DSS in a subframe, transmits the D2DSS in a DFN partition.

Option 2-3: A D2DSS measurement period is defined and a UE, which has transmitted the D2DSS in a subframe, transmits the D2DSS in an associated D2DSS measurement period.

Furthermore, a reference synchronization window for discovery may be applied to communication for D2DSS reception because discovery and communication share the same D2DSS resource. The UE can detect a correct position of D2DSS transmission for discovery after reception of a discovery resource pool. Further, since the D2DSS may be omitted or transmitted outside the synchronization window in the case of w2, D2DSS (reception) related UE supposition within the synchronization window may be limited to the case of w1.

Accordingly, the reference synchronization window can be applied to both discovery and communication on the basis of the principle that "a UE expects that D2DSS indicated by the resource pool configuration appears only within a signaled reference synchronization window if w1 is indicated."

Next, out-NW UEs will be described. For example, it is important to minimize the number of D2DSSs that need to be tracked by an out-NW UE. That is, the UE can track only a limited number of D2DSSs and thus cannot receive all incoming SA and data when the number of D2DSSs related to incoming SA and data exceeds the limited number.

Accordingly, UE capability of tracking different timings is limited and thus the following UE operations need to be considered.

1) A UE synchronized with the D2DSS transmits the same D2DSS in order to generate a synchronization cluster sharing common timing.

2) Only a data TX UE can be an ISS (Independent Synchronization Source).

3) If a specific sequence has been transmitted in a previous period, the ISS excludes the same D2DSS sequence during D2DSS reselection.

Accordingly, a D2DSS sequence selection process for out-NW UEs is determined by the following three steps. Hereinafter, a "set of D2DSS sequence(s) transmitted by a UE when the transmission timing reference is an eNB" is referred to as D2DSS_net and a "set of D2DSS sequence(s) transmitted by a UE when the transmission timing reference is not an eNB" is referred to as D2DSSue_oon, for example, for convenience of description.

Step 1: If an out-NW UE selects D2DSS X of D2DSSue_net as a TX timing reference thereof, the UE selects D2DSS Y in D2DSSue_oon and transmits the selected D2DSS Y during D2DSS transmission. Such selection may be randomly performed or the UE may avoid/prevent selection of a D2DSS detected during the TX timing reference selection process.

Step 2: If the UE selects D2DSS Z of D2DSSue_oon as a TX timing reference thereof, the UE transmits the same D2DSS Z during D2DSS transmission.

Step 3: If the UE has D2D data traffic to transmit, the UE can be an ISS (Independent Synchronization Source) using a D2DSS randomly selected from D2DSSue_oon.

Step 2 enables D2DSS relay operation of reducing the number of D2DSSs in a system in consideration of the fact that the UE synchronized with a D2DSS transmits the same D2DSS in order to generate a synchronization cluster sharing common timing.

Furthermore, if a specific sequence has been transmitted in a previous period, it is assumed that D2DSS Z is not detected in order to allow an ISS that has performed (or started) D2DSS Z transmission to be synchronized with another D2DSS in consideration of the fact that an ISS excludes the same D2DSS sequence during D2DSS reselection. In other words, the ISS can maintain ISS operation only when a D2DSS other than the D2DSS transmitted by the ISS is not detected during the reselection process before the reselection process is performed. After this process, the out-NW UE can determine a D2DSS sequence to be used for D2DSS transmission.

In addition, the present invention specifically defines "detecting D2DSS" because it is not appropriate that a D2DSS is considered to be detected and a UE is used as a reliable synchronization source when an associated PD2DSCH is not correctly decoded or PD2DSCH reception quality is considerably low. Specifically, when associated PD2DSCH reception quality (e.g., RSRQ of a PD2DSCH DMRS) is lower than a specific level, a UE can assume that the D2DSS is not detected (and thus the D2DSS does not affect the D2D synchronization process of the UE).

Therefore, according to the present invention, the following settings can be applied for D2DSS sequence selection.

If a UE selects D2DSSue_oon as a TX timing reference thereof, the UE transmits the same D2DSS.

The UE assumes that UEs transmitting the same D2DSS have been synchronized.

Conditions under which an out-NW UE transmits a D2DSS using a D2DSS sequence selected through the aforementioned process will be additionally described. Basically, D2DSS transmission condition formulations for in-NW UEs can be reused. A UE that is not an ISS transmits a D2DSS irrespective of whether SA/data thereof is transmitted when D2DSSs from other UEs are detected. That is, additional conditions for D2DSS transmission of a non-ISS UE may be needed. For example, an RSRP threshold value can be replaced by a D2DSS measurement threshold value and eNB configuration parts may be removed.

For reliable D2DSS detection and measurement of out-NW UEs, D2DSS transmission may need to be performed prior to SA transmission and D2DSS transmission maintaining conditions may be necessary.

Therefore, according to the present invention, conditions for determining whether a D2DSS will be transmitted in one subframe by an out-NW UE can be set as follows.

In the case of out-of-coverage UE

When a UE is an independent synchronization source (ISS), the UE needs to transmit a D2DSS in a subframe in a D2DSS resource selected by the UE for D2DSS transmission if the subframe is i) a subframe within a SA or D2D data period in which SA or D2D data is transmitted, ii) a subframe within X ms from a subframe in which the UE intends to transmit SA and/or iii) a subframe satisfying "condition for continuing D2DSS transmission".

When the UE is not an independent synchronization source, the UE needs to transmit a D2DSS in a subframe in a D2DSS resource that is not used to receive TX synchronization reference thereof i) when the subframe is a subframe in a SA or D2D data period in which SA or D2D data is transmitted, a subframe within X ms from a subframe in which the UE intends to transmit SA and/or a subframe satisfying the "condition for continuing D2DSS transmission" and/or when the D2DSS of the TX synchronization reference thereof is detected in a (preset) time window and/or ii) when a D2DSS measurement value of the TX timing reference is lower than a threshold value.

Furthermore, only two D2DSS resources are configured as D2D TX resources, and out-NW UEs receive a D2DSS from their synchronization references in one D2DSS resource and transmit a D2DSS in the remaining D2DSS resource.

In the case of out-of-coverage UEs, a periodically appearing synchronization resource is used for D2DSS transmission. Here, a PD2DSCH (if supported) may be transmitted during D2DSS transmission, for example. In addition, the size of the synchronization resource may be predefined and the period of the synchronization resource may be preset.

When a D2D synchronization source transmits a D2DSS in synchronization resources, the D2D synchronization source transmits the D2DSS in at least one synchronization resource and receives the D2DSS in at least other synchronization resources. Here, synchronization resources used to transmit and/or receive the D2DSS may be preset. In addition, a timing offset may be set between a synchronization resource for D2DSS reception and a synchronization resource for D2DSS transmission.

Therefore, according to the present invention, a UE must not transmit any (other) D2D signals/channels in a (D2DSS) subframe that is not used for D2DSS transmission thereof in order to clarify D2DSS reception from other UEs.

Next, whether a D2D-silent period is necessary when a UE performs the D2DSS reselection process will be described. Even when a synchronization resource periodically appears and the UE does not transmit any (other) D2D signals/channels in (other) synchronization resources other than synchronization resources used for D2DSs transmission thereof, D2DSS transmission from eNBs and UEs which are not synchronized with the periodic synchronization resource may be performed (in synchronization resources that are not used for D2DSS transmission of the UE). Accordingly, to allow UEs to efficiently scan potential asynchronous D2DSSs, it is necessary to define a "D2D-silent period" for D2D scanning that is not obstructed (or interfered with) by transmission of neighbor D2D UEs. If this period is not defined, an out-NW UE may not detect a D2DSS that is transmitted from an eNB or an in-NW UE and is weak but has high priority due to interference from other out-NW UEs.

Accordingly, the present invention can define the "D2D-slient period" as a multiple of a D2DSS period to support scanning of other synchronization sources by out-NW UEs.

Examples of the above-described proposed methods can be included as one of methods realized by the present invention and thus can be considered as proposed methods. Further, while the aforementioned proposed methods may be independently realized, some proposed methods may be combined/merged.

The above-described proposed methods may be restrictively applied to FDD system and/or TDD system environments.

The above-described proposed methods may be restrictively applied to mode-2 communication and/or type-1 discovery (and/or mode-1 communication and/or type-2 discovery).

The above-described proposed methods may be restrictively applied only when a D2D RX UE receives neighbor cell related synchronization error information of inter-cell discovery signal (and/or neighbor cell discovery signal) reception related W 1.

In addition, the above-described proposed methods may be restrictively applied to at least one of an in-coverage D2D UE, an out-coverage D2D UE and an RRC_connected D2D UE and an RRC idle D2D UE.

Furthermore, the above-described proposed methods may be restrictively applied to a D2D UE performing only D2D discovery (transmission/reception) operation (and/or a D2D UE performing only D2D communication (transmission(/reception)).

Moreover, the above-described proposed methods may be restrictively applied to a scenario in which only D2D discovery is capable/set (and/or a scenario in which only D2D communication is capable/set).

Further, the above-described proposed methods may be restrictively applied to an SHRXCH_D2D RX UE (and/or a SRXCH_D2D RX UE).

In addition, the above-described proposed methods may be restrictively applied to a situation in which carrier aggregation (CA) is applied or a situation in which CA is not applied.

Furthermore, the above-described proposed methods may be restrictively applied to a case in which D2D discovery signal reception in other (UL) carriers at an inter-frequency is performed and/or a case in which D2D discovery signal reception in other PLMN (UL) carriers based on inter-PLMN is performed.

Figure 14:
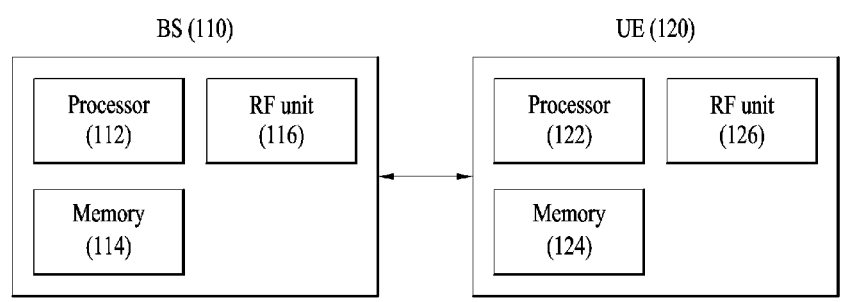
FIG. 14 illustrates a BS and a UE applicable to an embodiment of the present invention.

FIG. 14 illustrates a base station (BS) and a UE applicable to an embodiment of the present invention.

When a wireless communication system includes a relay, communication is performed between a BS and the relay on a backhaul link and communication is performed between the relay and a UE on an access link. Accordingly, the BS or UE shown in the figure may be replaced by the relay as necessary.

Referring to FIG. 14, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124 and a radio frequency (RF) unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While examples in which the D2D signal transmission/reception method in a wireless communication system are applied to 3GPP LTE have been described, the present invention is applicable to various wireless communication systems in addition to 3GPP LTE.

The invention claimed is:

1. A method for transmitting a device-to-device synchronization signal (D2DSS) by a first user equipment (UE) that is out of coverage of a base station in a wireless communication system, the method comprising:
    determining, by the first UE, that no synchronization source exists in a predetermined area based on a measurement value not being equal to or higher than a threshold value in the predetermined area;
    transmitting, by the first UE based on the determination, the D2DSS in a subframe; and
    repeatedly transmitting, by the first UE, the D2DSS in a plurality of subframes within a first time period prior to a second time period for a scheduling assignment (SA) scheduling a D2D data channel,
    wherein repeatedly transmitting the D2DSS is performed regardless of whether the SA is transmitted or not within the second time period based on a predetermined condition being satisfied,
    wherein the predetermined condition comprises (i) a D2DSS transmission timer related to the first time period being configured for the first UE and (ii) the subframe being included within a third time period in which the SA is transmitted,
    wherein the plurality of subframes are periodically configured as a 40 ms period, and
    wherein the measurement value is related to a physical sidelink broadcast channel demodulation reference signal (PSBCH DMRS).

2. A first user equipment (UE), that is out of coverage of a base station, for transmitting a device-to-device synchronization signal (D2DSS) in a wireless communication system, the first UE comprising:
    a memory; and
    at least one processor operatively coupled with the memory,
    wherein the at least one processor is configured to:
    determine that no synchronization source exists in a predetermined area based on a measurement value not being equal to or higher than a threshold value in the predetermined area;
    transmit, based on the determination, the D2DSS in a subframe; and
    repeatedly transmit the D2DSS in a plurality of subframes within a first time period prior to a second time period for a scheduling assignment (SA) scheduling a D2D data channel,
    wherein repeatedly transmitting the D2DSS is performed regardless of whether the SA is transmitted or not within the second time period based on a predetermined condition being satisfied,
    wherein the predetermined condition comprises (i) a D2DSS transmission timer related to the first time period being configured for the first UE and (ii) the subframe being included within a third time period in which the SA is transmitted,
    wherein the plurality of subframes are periodically configured as a 40 ms period, and
    wherein the measurement value is related to a physical sidelink broadcast channel demodulation reference signal (PSBCH DMRS).

3. The method of claim 1, wherein a time gap is configured between the first time period and the second time period.

4. The method of claim 3, wherein a size of the time gap is equal to or less than a predetermined time limit.

* * * * *